Sept. 8, 1942.  H. BROOKS  2,295,331
CAPACITOR UNIT
Filed July 13, 1939    2 Sheets-Sheet 1
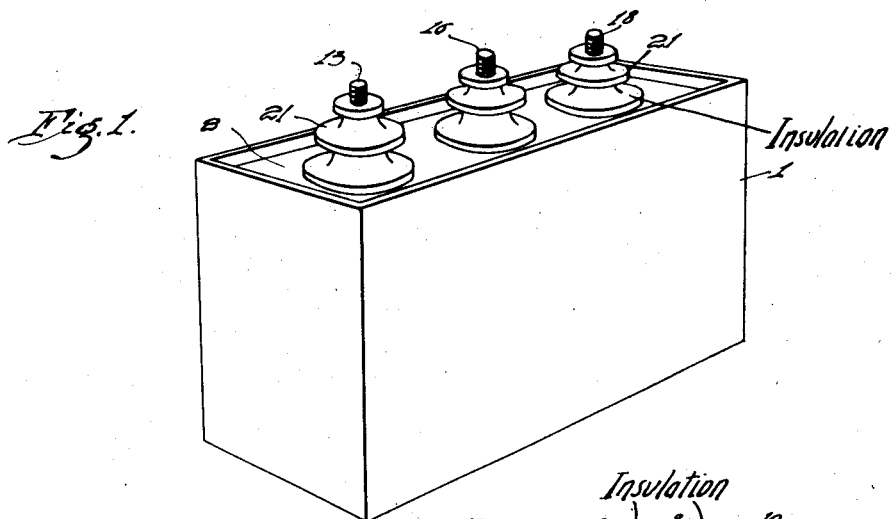
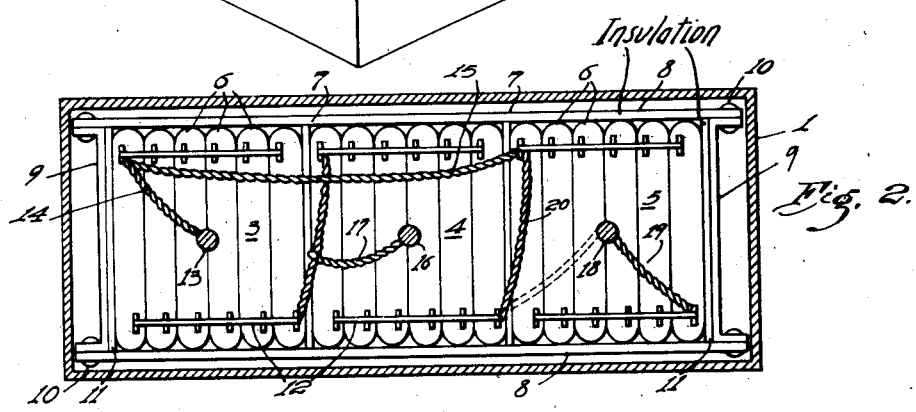
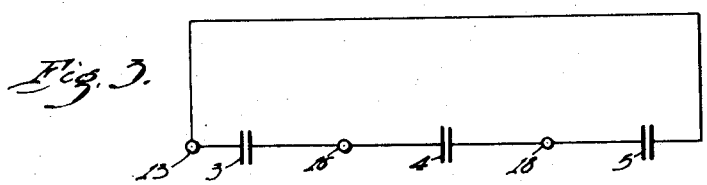
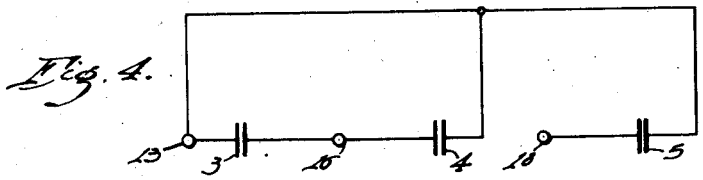
WITNESSES:
E. L. Leiding.
F. P. Lyle
INVENTOR
Hamilton Brooks.
BY
O. B. Buchanan
ATTORNEY Sept. 8, 1942.     H. BROOKS     2,295,331
CAPACITOR UNIT
Filed July 13, 1939     2 Sheets-Sheet 2

WITNESSES:
E. H. Leiding.
F. P. Lyle

INVENTOR
Hamilton Brooks.
BY
O. B. Buchanan
ATTORNEY

Patented Sept. 8, 1942

2,295,331

UNITED STATES PATENT OFFICE 2,295,331

CAPACITOR UNIT

Hamilton Brooks, Wilkinsburg, Pa., assignor to Westinghouse Electric & Manufacturing Company, East Pittsburgh, Pa., a corporation of Pennsylvania Application July 13, 1939, Serial No. 284,137

5 Claims. (Cl. 175—41)

The present invention relates to electrical capacitors, and more particularly to power capacitor units such as are used for power factor correction on transmission and distribution lines.

Capacitor units of this type usually consist of a plurality of sections or windings contained in a metal case which is filled with a suitable liquid insulating compound. Such units are usually built as either single-phase or three-phase units, the three-phase units having three equal groups of capacitor sections which are connected in delta inside the case and brought out to three terminals on top. When single-phase units are used on a three-phase line, the number of units must be a multiple of three in order to obtain a balanced condition, while if three-phase units are used, the circuit can be balanced with any number. For this reason, three-phase units are often preferred since a smaller number of larger size units can usually be used, resulting in a lower cost, as the cost per kva. of a capacitor is less for larger units.

It sometimes happens, however, that a transmission or distribution line is initially operated at one voltage and is later changed to operate at a higher voltage. When this is done, three-phase capacitor units connected to the line cannot be used on the new voltage, since they cannot be reconnected for a different voltage than that for which they were designed. This condition has led to a demand for capacitor units which could be reconnected to the line to operate satisfactorily at a higher voltage, and single-phase sectionalized units have been developed for this purpose. Capacitor units of this type are disclosed in the copending application of R. E. Marbury and W. H. Cuttino, Serial No. 257,852, filed February 23, 1939, now Patent No. 2,264,994, issued December 2, 1941, and assigned to the Westinghouse Electric & Manufacturing Company. These units contain two sections of unequal capacitance, one having approximately twice the capacitance of the other, with both sections connected to a common terminal at one end of the case, the larger section connected to a terminal in the center and the smaller section to a terminal at the opposite end. Such units can be connected in delta and, if the voltage of the line is later raised, they can be reconnected in star to operate on the higher voltage. A balanced condition can be obtained with an even number of units in either connection.

The three-phase type of unit is very desirable in many cases because of the simplicity of the connections to the line and because the circuit can be balanced with any number of units. Because of the possibility of raising the voltage of the line, however, it would be desirable to be able to reconnect such units as single-phase sectionalized units to permit operation on a higher voltage. This cannot be done with the ordinary type of three-phase units, since the connections are permanently made inside the case, which is sealed up and cannot be opened to permit access to the connections.

The object of the present invention therefore is to provide a capacitor unit which can be readily converted from a three-phase unit to a single-phase sectionalized unit of the type described above. Such units can be used as three-phase units in the usual way, or if it is desired to operate them on a higher voltage, their internal connections can be readily changed to the sectionalized type. These units are also advantageous from the manufacturer's viewpoint, since the more active of the two types of units can be kept in stock and, when an order is received for the other type, the necessary number of units can be readily converted before shipment. In this way the number of different types of capacitor units which it is necessary to carry in stock is reduced.

Other objects and advantages of the invention will be apparent from the following detailed description, taken in connection with the accompanying drawings, in which:

Figure 1 is a perspective view of a capacitor unit;

Fig. 2 is a plan view of the interior of the unit, with the case and terminals in section, showing the internal connections;

Figs. 3 and 4 are simplified wiring diagrams showing the connections of the unit;

Figure 5:
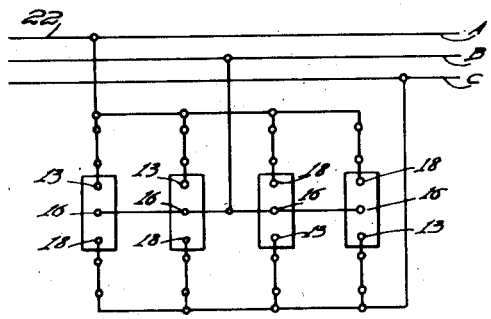
Figs. 5 and 6 are wiring diagrams showing the connection of sectionalized units in delta and star, respectively.

The capacitor unit shown in Figs. 1 and 2 is contained in a metal case 1, which is preferably of welded construction to make it air-tight and leakproof, and which has a top 2 welded in place. The case contains three capacitor elements 3, 4 and 5 of substantially equal capacitance, each of which preferably consists of a plurality of capacitor sections 6. The sections 6 may be of the usual construction, consisting of a plurality of layers of metal foil and paper which are wound together on a mandrel and then flattened and impregnated with a suitable insulating compound. These sections are assembled in three groups to form the three capacitor elements 3, 4 and 5, the groups being separated by insulating spacers 7. All of the sections are supported in a generally channel-shaped member 8 of pressboard, or other suitable insulating material, and are clamped in position in it by means of metal clamp plates 9 which are fastened in the ends of the channel member 8 by rivets 10. Insulating spacers 11 may be provided between the sections 6 and the clamp plates 9.

The capacitor sections 6 of each group are connected together in any suitable manner by conductors 12. One terminal of group 3 is connected to a terminal stud 13 by a cable 14, and also to one terminal of group 5 by a cable 15. The other terminal of group 3 is connected to one terminal of group 4 and to a terminal stud 16 by means of a cable 17. The second terminal of group 5 is connected to a terminal stud 18 by a cable 19. A cable 20 is connected to the second terminal of group 4, and this cable may be connected either to a terminal of group 5, as shown in full lines, or to the terminal stud 18, as shown in dotted lines in Fig. 2. The three terminal studs 13, 16 and 18 extend through porcelain bushings 21 which are sealed in the top 2 of the case. The bushing 21 of the terminal 18 is preferably made removable in order to permit access to the interior of the case for changing the connections.

When the cable 20 is connected to the terminal 18, the three elements of the capacitor unit are connected in delta, as shown in the simplified diagram of Fig. 3, and the connection is the same as that of an ordinary three-phase unit. If it is desired to reconnect it as a single-phase sectionalized unit, the removable terminal 18 is removed and the cable 20 disconnected from it and connected to the terminal of the capacitor element 5. This results in the connection shown in Fig. 4, in which the terminal 13 becomes the common terminal of a sectionalized unit, with the terminal 16 connected to two of the elements and the terminal 18 connected to the third, so that two sections are provided, one having twice the capacity of the other. It will be understood, of course, that this process may be reversed and a sectionalized unit converted to a three-phase unit in the same manner.

Figure 6:
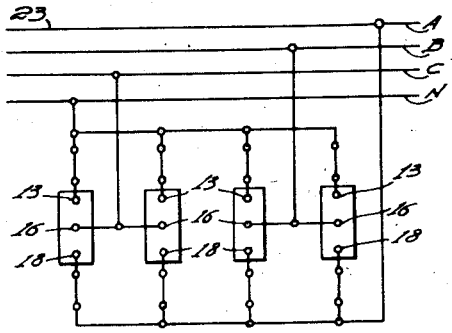

The connections of the single-phase sectionalized units to a three-phase line are shown in Figs. 5 and 6. Fig. 5 shows four of these units connected in delta to a three-phase line 22, and it will be seen from this figure that they are so connected that the sections of larger capacity of two of the units are connected across the phase AB, the sections of larger capacity of the other two units are connected across the phase BC, while the smaller sections of all four units are connected across the phase AC, so that a balanced condition is obtained with an even number of units. It will be obvious that any even number of units may be used, additional units merely being placed in parallel with those shown.

Fig. 6 shows the connection in star for operation at a higher voltage on a three-phase line 23 having a neutral conductor N. In this connection, half of the units are rotated 180° from their position in Fig. 5 so that the common terminals are all at the same side of the assembly, and it will be readily apparent from the figure that the effect of this connection in obtaining a balanced condition is similar to that of the delta connection. Thus, the sections of smaller capacity of all the units are connected between conductor A and neutral, the sections of larger capacity of half the units are connected between conductor B and neutral, and the sections of larger capacity of the other half of the units are connected between conductor C and neutral. Thus, it will be seen that units of this type can be connected in delta for use on a line of one voltage and later reconnected in star for operation at a higher voltage if the voltage of the line is increased, and that a balanced condition may be obtained with an even number of units, as more fully explained in the Marbury and Cuttino patent mentioned above. The present invention makes it possible to convert units of this type into ordinary three-phase units, or vice versa, and thus the advantages of both types may be obtained in one unit.

Figure 7:
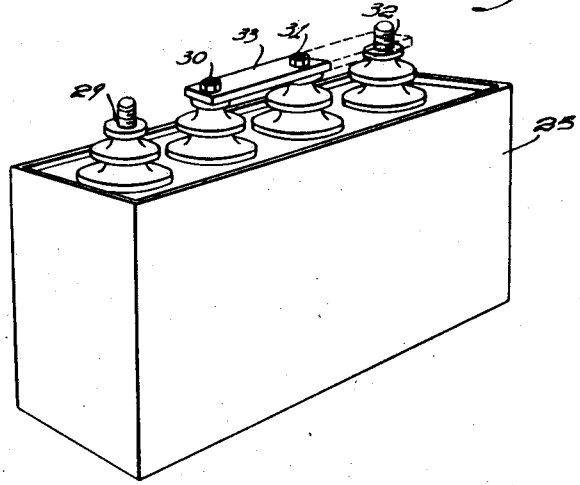
Fig. 7 is a perspective view of a modified type of unit.
Figure 8:
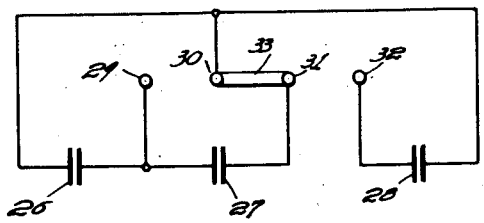
Fig. 8 is a wiring diagram showing the connections of the capacitor shown in Fig. 7.

Figs. 7 and 8 show a modified embodiment of the invention. The capacitor unit shown in these figures has a case 25 similar to that described in connection with Fig. 1, and contains three equal capacitor elements or groups of capacitor sections 26, 27 and 28, which may be similar to the capacitor elements 3, 4 and 5, previously described. In this embodiment of the invention, however, four terminals 29, 30, 31 and 32 are provided on top of the case and the internal connections between the elements and the terminals are made as shown in Fig. 8. In order to convert the unit from one type to the other, a strap connector 33 is provided which connects the terminal 31 alternatively to either the terminal 30 or the terminal 32. When the terminals 30 and 31 are connected together, as shown in Fig. 8, the unit is a single-phase sectionalized unit and it will be seen that the connection is similar to that of Fig. 4, 31 being the common terminal, 29 the terminal of the larger section and 32 the terminal of the smaller section. When the connector 33 is used to connect the terminals 31 and 32 together, as shown in dotted lines in Fig. 7, the unit is a three-phase unit and the connection is similar to that shown in Fig. 3. This embodiment of the invention has the advantage that the connections are changed on the outside of the case and it is not necessary to remove one of the terminals to make the conversion from one type of unit to the other. It has the disadvantages, however, that the cost is increased because of the additional terminal, and that when connected as a sectionalized unit, the common terminal is in the center rather than at the end, which makes the connections of the unit to a line somewhat more complicated.

It should now be apparent that a capacitor unit has been provided which can be readily converted from a three-phase unit to a single-phase sectionalized unit, and that in this way the advantages of both types can be obtained in the same unit, since it is readily convertible from one to the other when necessary to meet the requirements of a particular application. It is to be understood that the invention is capable of various embodiments and modifications, and that although certain specific arrangements have been shown and described for the purpose of illustration, the invention is not limited to the exact arrangements shown, but in its broadest aspects it includes all equivalent embodiments and modifications which come within the scope of the appended claims.

I claim as my invention:

1. A capacitor unit adapted to be alternatively connectible either as a three-phase delta-connected unit or as a single-phase unit having two sections of unequal capacitance, said capacitor unit having a case, three capacitor elements of approximately equal capacitance disposed in the case, connection-means for connecting together one terminal of a first one of said capacitor elements and one terminal of a second one of said capacitor elements, connection-means for connecting together the other terminal of the first capacitor element and one terminal of the third capacitor element, a first terminal device mounted on the case, means for connecting said terminal device to the other terminal of the third capacitor element, second and third terminal devices mounted on the case, means for connecting said second and third terminal devices to the connection-means between the first and second capacitor elements and between the first and third capacitor elements, respectively, all of said connections being permanently made within the case, and changeable connection-means for alternatively connecting the remaining terminal of the second capacitor element either to said first terminal device or to the connection-means between the first and third capacitor elements.

2. A capacitor unit having a closed case, three capacitor elements of substantially equal capacitance contained in the case, connection-means for connecting together a terminal of a first one of said capacitor elements and a terminal of a second one of said capacitor elements, first, second and third terminal devices mounted on the case, means connecting the other terminal of said first capacitor element to the first terminal device, means connecting said terminal of the second capacitor element to the second terminal device, means connecting one terminal of the third capacitor element to the third terminal device, connection-means for connecting together the other terminal of the third capacitor element and the last-mentioned terminal of the first capacitor element, all of said connections being permanently made inside the case, and connection-means within the case for alternatively connecting the remaining terminal of the second capacitor element either to the third terminal device or to the connection-means between the first and third capacitor elements.

3. A capacitor unit having a closed case, three capacitor elements of substantially equal capacitance contained in the case, connection-means for connecting together a terminal of a first one of said capacitor elements and a terminal of a second one of said capacitor elements, first, second and third terminal devices mounted on the case, means connecting the other terminal of said first capacitor element to the first terminal device, means connecting said terminal of the second capacitor element to the second terminal device, means connecting one terminal of the third capacitor element to the third terminal device, connection-means for connecting together the other terminal of the third capacitor element and the last-mentioned terminal of the first capacitor element, all of said connections being permanently made inside the case, and a connector connected to the remaining terminal of the second capacitor element and adapted to be attached alternatively either to the third terminal device or to the connection-means between the first and third capacitor elements.

4. A capacitor unit having a closed case, three capacitor elements of substantially equal capacitance contained in the case, four terminal devices mounted on the case, connection-means within the case for connecting together a terminal of a first capacitor element, a terminal of a second capacitor element and a first one of said terminal devices, connection-means for connecting together the other terminal of said first capacitor element and a terminal of the third capacitor element, means connecting a second terminal device to said last-mentioned connection-means, connection-means for connecting together the other terminal of the second capacitor element and a third terminal device, connection-means for connecting together the other terminal of the third capacitor element and the fourth terminal device, all of said connections being permanently made within the case, and means for alternatively connecting the third terminal device either to the second terminal device or to the fourth terminal device.

5. A capacitor unit adapted to be alternatively connectible either as a three-phase delta-connected unit or as a single-phase unit having two sections of unequal capacitance, said capacitor unit having a case, three capacitor elements of substantially equal capacitance disposed in the case, connection-means for permanently connecting together a terminal of a first one of said capacitor elements and a terminal of a second one of said capacitor elements and for permanently connecting the other terminal of the first capacitor element to a terminal of the third capacitor element, three terminal devices mounted on the case, means for permanently connecting each terminal device to a terminal of a corresponding capacitor element, and changeable connection-means for alternatively connecting the other terminal of said second capacitor element either to the terminal device which is connected to a terminal of the third capacitor element or to the other terminal of the third capacitor element.

HAMILTON BROOKS.